US008744765B2

(12) United States Patent
Miller et al.

(10) Patent No.: US 8,744,765 B2
(45) Date of Patent: Jun. 3, 2014

(54) PERSONAL NAVIGATION SYSTEM AND ASSOCIATED METHODS

(75) Inventors: Paul A. Miller, Cranberry Township, PA (US); David Kodrin, Trafford, PA (US); Christopher Evan Watson, Monroeville, PA (US); Chadd Cron, Bellevue, PA (US); Scott Pavetti, Springdale, PA (US)

(73) Assignee: MSA Technology, LLC, Cranberry Township, PA (US)

( * ) Notice: Subject to any disclaimer, the term of this patent is extended or adjusted under 35 U.S.C. 154(b) by 243 days.

(21) Appl. No.: 12/843,294

(22) Filed: Jul. 26, 2010

(65) Prior Publication Data
US 2011/0029241 A1 Feb. 3, 2011

Related U.S. Application Data

(60) Provisional application No. 61/229,824, filed on Jul. 30, 2009.

(51) Int. Cl.
*G01C 21/10* (2006.01)

(52) U.S. Cl.
USPC ............ 701/500; 701/433; 701/434; 701/505

(58) Field of Classification Search
USPC ......... 701/220, 500, 412, 446, 469, 434, 505, 701/517; 702/141; 482/1, 51, 8, 9; 473/353, 473/270, 570; 73/510; 356/5.01
See application file for complete search history.

(56) References Cited

U.S. PATENT DOCUMENTS 5,583,776 A * 12/1996 Levi et al. .................... 701/400
5,724,265 A 3/1998 Hutchings
5,899,963 A 5/1999 Hutchings
6,122,960 A 9/2000 Hutchings et al.
6,305,221 B1 10/2001 Hutchings
6,571,193 B1 5/2003 Unuma et al.
6,646,564 B1 11/2003 Azieres et al.

(Continued)

FOREIGN PATENT DOCUMENTS

GB 2447647 A 9/2008
WO 2008087651 A2 7/2008

OTHER PUBLICATIONS

Foxlin, Pedestrian Tracking with Shoe-Mounted Inertial Sensors, IEEE Computer Society, Nov.- Dec. 2005, pp. 38-46.

(Continued)

*Primary Examiner* — Tuan C. To
*Assistant Examiner* — Issac Smith
(74) *Attorney, Agent, or Firm* — The Webb Law Firm

(57) ABSTRACT

A personal navigation system, including: at least one inertial sensor module associated with a user, the inertial sensor module comprising at least one sensor to generate location data associated with the user; a communication device to receive and/or transmit at least a portion of the location data; and an onsite computer to communicate with the communication device and receive at least a portion of the location data; wherein at least one of the inertial sensor module and the onsite computer is configured to determine at least one activity of the user based at least in part upon the location data; wherein the onsite computer is programmed to configure a display including a representation of the user based at least in part upon the location data; wherein at least one of the determination and the configuration is performed substantially in real-time.

20 Claims, 14 Drawing Sheets

(56) References Cited

U.S. PATENT DOCUMENTS

| | | | |
|---|---|---|---|
| 6,826,477 B2* | 11/2004 | Ladetto et al. | 701/472 |
| 7,467,060 B2* | 12/2008 | Kulach et al. | 702/141 |
| 7,715,982 B2* | 5/2010 | Grenfell et al. | 701/468 |
| 8,072,581 B1* | 12/2011 | Breiholz | 356/5.01 |
| 2001/0023360 A1 | 9/2001 | Nelson et al. | |
| 2002/0091482 A1 | 7/2002 | Eakle, Jr. et al. | |
| 2007/0208544 A1 | 9/2007 | Kulach et al. | |
| 2008/0077326 A1* | 3/2008 | Funk et al. | 701/220 |
| 2009/0043504 A1 | 2/2009 | Bandyopadhyay et al. | |
| 2010/0184563 A1* | 7/2010 | Molyneux et al. | 482/1 |
| 2011/0054836 A1 | 3/2011 | Foxlin | |

OTHER PUBLICATIONS

Ali et al., Alignment of Strapdown Inertial Navigation System: a Literture Survey Spanned over the Last 14 years, pp. 1-12.

Gebre-Egziabher et al., A Gyro-Free Quaternion-Based Attitude Determination System Suitable for Implementation Using Low Cost Sensors, Position Location and Navigation Symposium IEEE, 2000, pp. 185-192.

Alonso et al., Centering and Observability in Attitude-Independent Magnetometer-Bias Determination, The Journal of the Astronautical Sciences, Apr.-Jun. 2003, pp. 133-141, vol. 51, No. 2.

Alonso et al., Twostep: A Fast Robust Algorithm for Attitude-Independent Magnetometer-Bias Determination, The Journal of the Astronautical Sciences, Oct.-Dec. 2002, pp. 433-451, vol. 50, No. 4.

Vasconcelos et al., A Geometric Approach to Strapdown Magnetometer Calibration in Sensor Frame, 2nd IFAC Workshop Navigation, Guidance and Control of Underwater Vehicles, 2008 vol. 2, Part 1, Lakeside Hotel, Ireland.

Markley, Fast Quaternion Attitude Estimation from Two Vector Measurements, Journal of Guidance, Control, and Dynamics, 2002, pp. 411-414, vol. 25, No. 2.

Crassidis et al., Real-Time Attitude-Independent Three-Axis Magnetometer Calibration, Journal of Guidance, Control, and Dynamics, 2005, pp. 115-120, vol. 28, No. 1.

Alonso et al., Attitude-Independent Magnetometer-Bias Determination: A Survey, The Journal of the Astronautical Sciences, Oct.-Dec. 2002, pp. 453-475, vol. 50, No. 4.

Thomasson et al., Understanding the Fresnel Zone, Oct. 1996, 2 pages.

Woodman, An Introduction to Inertial Navigation, Technical Report No. 696, University of Cambridge Computer Laboratory, Aug. 2007, pp. 1-37.

Motorola's Canopy Wireless Broadband Platform: The Secure, Flexible, Reliable Wireless Solution for Building or Extending Your Broadband Network, Motorola, 2006, available at http://www.ptsupply.com/pdf/motorola_canopy_CanopyOverview-US.pdf.

Motorola Canopy Wireless Broadband 900 MHz System Providing Reliable Broadband Service to Remote Customers with Canopy System 900 MHz Modules, Motorola, 2004, available at http://www.motorola.com/web/Business/_Documents/static%20files/900%20Mhz%20Module.

Motorola Canopy Wireless Broadband 2.4 GHz Modules, Motorola, 2003, available at http://www.motorola.com/web/Business/_Documents/static%20files/2.4%20GHz%20Canopy%20System.pdf?pLibItem=1&localeId=33.

Lehr et al., Wireless Internet Access: 3g vs. WiFi?, Telecommunications Policy, 2003, pp. 351-370, vol. 27.

Faulkner et al., GPS-denied Pedestrian Tracking in Indoor Environments Using an IMU and Magnetic Compass, Jun. 20, 2011, pp. 1-7.

\* cited by examiner

PERSONAL NAVIGATION SYSTEM AND ASSOCIATED METHODS

CROSS REFERENCE TO RELATED APPLICATIONS

This application claims the benefit of priority from provisional Patent Application No. 61/229,824, filed Jul. 30, 2009, the contents of which are incorporated herein in its entirety.

BACKGROUND OF THE INVENTION

1. Field of the Invention

The present invention generally relates to the field of navigation and/or position tracking. In particular, the present disclosure is directed to a personal navigation system that uses foot-mounted inertial sensors and associated methods.

2. Description of the Related Art

Personal navigation and tracking systems are being developed today for use in any number of applications. In one example, personal navigation and tracking systems may be useful in military applications for tracking and directing the movements of military personnel during military practice maneuvers and/or military battlefield environments. In another example, personal navigation and tracking systems may be useful in field service applications for tracking field service personnel and/or a fleet of vehicles that have been dispatched into the field. In yet another example, personal navigation and tracking systems may be useful in first responder applications for tracking and directing the positions of, for example, law enforcement personnel at the scene of a crime or accident, firefighters at the scene of an accident or fire, and/or emergency medical services (EMS) personal at the scene of an accident.

With respect to first responder applications, firefighters have lost their lives because of the lack of effective indoor navigation and tracking systems. As a result, there is particular interest in developing effective navigation and tracking systems for indoor use. While navigation and tracking systems for outdoor use have been effectively implemented using, for example, satellite-based navigation systems, such as Global Positioning System (GPS) technology, traditional systems for navigating indoors, such as within a building, are generally costly or ineffective. For example, the installation and operating costs associated with an installed base of radio frequency markers within a building are substantial barriers not readily overcome. In addition, poor reception of radio frequency navigation signals within a building, such as that used by satellite-based navigation systems, precludes widespread acceptance.

More specifically, indoor environments pose particular challenges with respect to implementing navigation and tracking systems. For example, signal transmission in indoor environments may be characterized by the presence of reflections, attenuation, low signal to noise ratio, and signal multipath effects; all of which may decrease tracking accuracy and may prevent signal acquisition all together. Further, multiple story buildings pose additional obstacles for tracking, as they require three-dimensional positioning.

Another type of navigating system is an inertial navigation system (INS), which is a navigation aid that uses a computer and motion sensors to continuously calculate via dead reckoning the position, orientation, and velocity of a moving object without the need for external references.

An INS includes at least a computer and a platform or module containing accelerometers, gyroscopes, or other motion-sensing devices. A typical INS is initially provided with its position and velocity from another source (a human operator, a GPS satellite receiver, etc.), and thereafter computes its own updated position and velocity by integrating information received from the motion sensors. The advantage of an INS is that it requires no external references in order to determine its position, orientation, or velocity once it has been initialized.

Inertial navigation systems are used in many different moving objects, including vehicles, aircraft, submarines, spacecraft, and guided missiles. However, their components size, cost, and complexity places constraints on the environments in which INS is practical for use.

A further shortcoming of inertial navigation systems is that they suffer from "integration drift." For example, small errors in the measurement of acceleration and angular velocity are integrated into progressively larger errors in velocity, which is compounded into still greater errors in position. This is a problem that is inherent in every open loop control system. Since the new position is calculated solely from the previous position, these errors are cumulative, increasing at a rate roughly proportional to the time since the initial position was input. Therefore the position fix must be periodically corrected by input from some other type of navigation system. The inaccuracy of a good-quality navigational system may be as much as 0.6 nautical miles per hour in position and on the order of tenths of a degree per hour in orientation.

In view of the shortcomings of the aforementioned navigation and tracking systems, a need exists for new approaches to personal navigation and tracking. In particular, a need exists for a practical and cost-effective personal navigation and tracking system that is highly accurate and reliable in any environment and that is suitable for use in any application, such as, but not limited to, military applications and first responder applications.

SUMMARY OF THE INVENTION

Therefore and generally, the present invention is directed to a personal navigation system and associated methods that address or overcome some or all of the deficiencies present in known and existing systems and methods.

In one preferred and non-limiting embodiment, the present invention provides a personal navigation system, including: at least one inertial sensor module associated with a user, the inertial sensor module including at least one sensor configured to generate location data associated with the user. A communication device is configured to receive and/or transmit at least a portion of the location data, and an onsite computer is configured to communicate with the communication device and receive at least a portion of the location data. The at least one of the inertial sensor module and/or the onsite computer is configured to determine at least one activity of the user based at least in part upon the location data, and the onsite computer is programmed to configure a display including a representation of the user based at least in part upon the location data. Further, the determination and/or the configuration is performed substantially in real-time.

In another preferred and non-limiting embodiment, the present invention provides a method of determining the location of a user wearing an inertial sensor module on at least one foot. The method includes: generating, by the inertial sensor module, raw location data; determining at least one activity of the user based at least partially upon the raw location data; applying activity-specific error correction to the raw location data to generate corrected location data; transmitting the corrected location data to an onsite computer substantially in real-time; and configuring a real-time graphical representation of the user based at least partially upon the corrected location data.

In a still further preferred and non-limiting embodiment, the present invention provides a personal navigation system including at least one onsite computer having a computer readable medium having stored thereon instructions, which, when executed by a processor of the computer, causes the processor to: receive location data generated by at least one sensor of at least one inertial sensor module located on the foot of a user; process the location data to determine at least one activity of the user based at least in part upon the location data; and render, on a display and substantially in real-time, a graphical representation of the user based at least partially upon the received location data.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
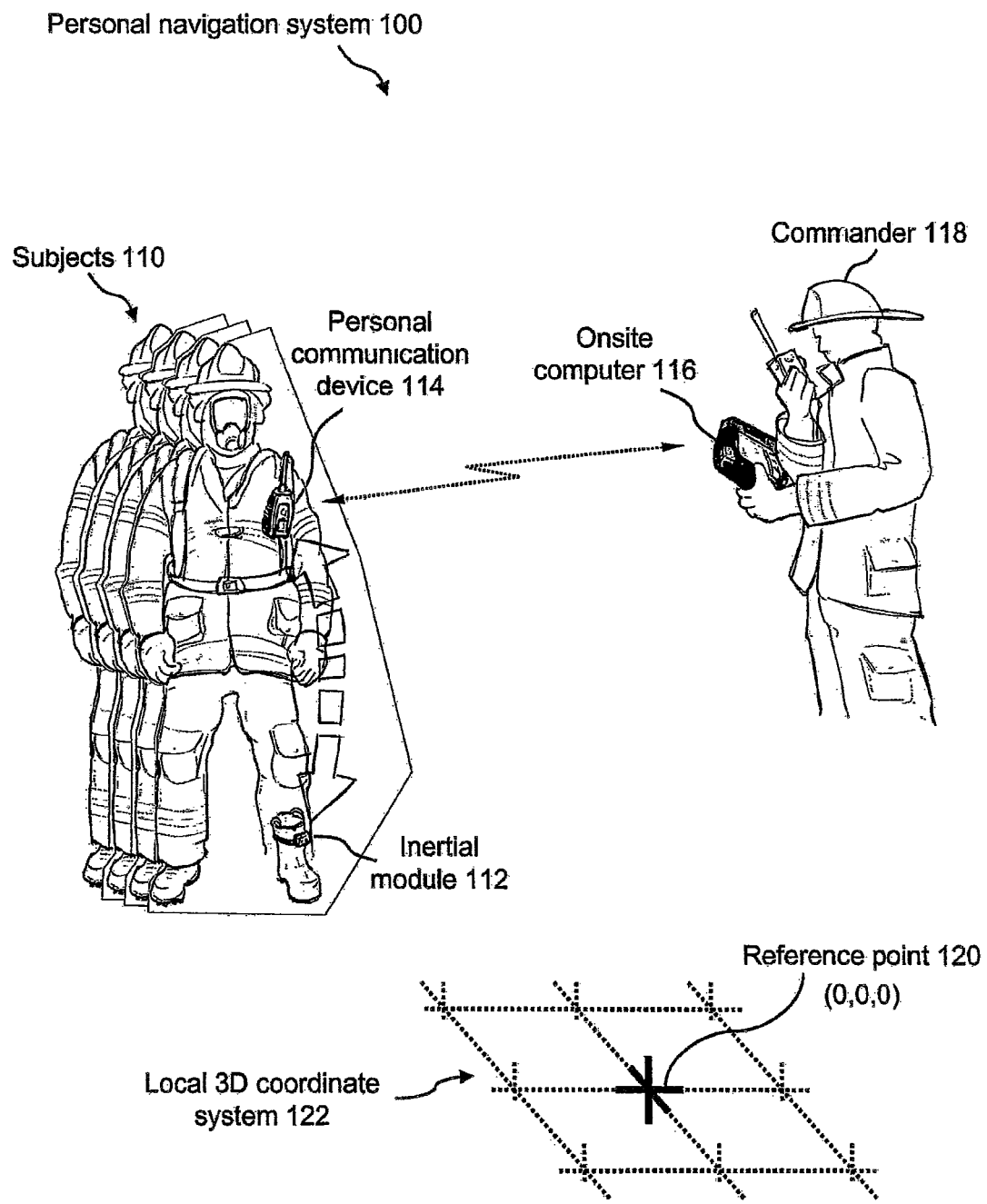
FIG. 1 is a functional block diagram of an example of a personal navigation system, according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting. Further, it is to be understood that the invention may assume various alternative variations and step sequences, except where expressly specified to the contrary.

The present disclosure describes a personal navigation system that uses foot-mounted inertial sensors and associated methods. The foot-mounted inertial sensors are worn by individuals who are the subjects of the navigation and/or tracking process. In particular, by use of certain algorithms and improved error correction processes, accurate location data along with activity types (e.g., walking, running, crawling, climbing, rappelling, jumping, falling, riding an elevator, and riding an escalator) may be transmitted wirelessly from the foot-mounted inertial sensors to man-worn communication devices using short range radio technology. Subsequently, this information is transmitted from the man-worn communication devices to an onsite computer via long range radio technology. Application software on the onsite computer acquires and processes the location data and activity information of one or more subjects and renders a graphical representation of the activity that is taking place at the scene, all in real time.

An aspect of the personal navigation system and associated methods of the present disclosure is that it is capable of accurately and reliably tracking one or more subjects indoors and/or outdoors in real time.

Another aspect of the personal navigation system and associated methods of the present disclosure is that it is capable of identifying the type of activity (e.g., walking, running, crawling, climbing, rappelling, jumping, falling, riding an elevator, and riding an escalator) of the one or more subjects in real time.

Another aspect of the personal navigation system and associated methods of the present disclosure is that once the type of activity is identified, activity-specific error correction is applied to the raw location data of the inertial sensors in order to generate corrected location data that accurately indicates the location of the subjects wearing the inertial sensors.

Yet another aspect of the personal navigation system and associated methods of the present disclosure is that it is capable of accurately and reliably rendering a graphical representation of the activities of the one or more subjects in real time. In this way, a comprehensive visualization of the activity that is taking place at the scene is provided.

Yet another aspect of the personal navigation system and associated methods of the present disclosure is that data processing occurs locally at the devices worn by the subjects of the navigation and/or tracking process. As a result, rather than transmitting large volumes of raw data, the results only of the data processing are transmitted from these devices to the onsite computer in real time. In this way, the data bandwidth requirements of the personal navigation system are optimized.

Still another aspect of the personal navigation system and associated methods of the present disclosure is that it is low complexity and low cost.

While the following description of the personal navigation system of the present disclosure is provided in the context of a first responder application (e.g., for tracking firefighters in or near a building), this is exemplary only. The personal navigation system of the present disclosure is not limited to use in first responder applications only. Rather, the personal navigation system of the present disclosure may be used in any navigation and/or tracking application in any indoor or outdoor environment. Further, the personal navigation system of the present disclosure is not limited to the tracking of persons; it is also suitable for tracking objects.

FIG. 1 illustrates a functional block diagram of an example of a personal navigation system 100, according to the present disclosure. Personal navigation system 100 is an example of an inertial navigation system (INS) that is characterized by (1) its ability to accurately and reliably track one or more subjects indoors and/or outdoors in real time, (2) its ability to identify the type of activity of the one or more subjects in real time, (3), its ability to accurately and reliably render a graphical representation of the activities of the one or more subjects in real time, and (4) its low complexity and low cost.

Personal navigation system 100 includes the combination of inertial sensor devices and a communication device, both of which are wearable by the subject of the navigation and/or tracking operations of the system. For example, one or more subjects 110 may be associated with personal navigation system 100, where each subject 110 may be any individual who is the subject of the navigation and/or tracking operations of the system. In one example, in the context of a first responder application, each subject 110 may be a firefighter that is being tracked in or near a building at the scene of an incident. Each subject 110 that is associated with personal navigation system 100 is wearing an inertial sensor module 112.

Inertial sensor module 112 is a foot-mounted device that houses one or more inertial sensors (e.g., one or more accelerometers and gyroscopes), along with control electronics and software. Preferably, inertial sensor module 112 is mounted on the footgear of each subject 110 and below the ankle of each subject 110. Inertial sensor module 112 may be mounted on the footgear of each subject 110 via, for example, a strap or harness or by integration into the footgear itself. The control electronics and software of inertial sensor module 112 is able to process the raw location data (i.e., raw xyz coordinates) in order to (1) determine the type of activity of the respective subject 110 and (2) apply activity-specific error correction to the raw data in order to generate "corrected" location data (i.e., corrected xyz coordinates) that accurately indicates its location. Additionally, inertial sensor module 112 has short range radio capability for transmitting any data thereof. More details of an example of an inertial sensor module 112 are described with reference to FIGS. 2A and 2B.

Each subject 110 associated with personal navigation system 100 is also wearing a personal communication device 114. Preferably, personal communication device 114 has both short range and long range radio capability. For example, the short range radio capability of personal communication device 114 is able to receive data from inertial sensor module 112 that is also being worn by each subject 110. Additionally, the long range radio capability of personal communication device 114 is able to communicate with any other computing device that is not in its close range vicinity. For example, each personal communication device 114 is able to transmit the data received from its corresponding inertial sensor module 112 along with any other data to, for example, an onsite computer 116. In this way, the combination of an inertial sensor module 112 and a personal communication device 114 worn by each subject 110 provides the means for supplying accurate location information of the subject to any interested parties at the scene of the incident. More details of an example of a personal communication device 114 are described with reference to FIGS. 3A and 3B.

Onsite computer 116 may be any computing device that is capable of processing and executing program instructions. Onsite computer 116 may be generally any device including, or connected to, a processor and a user interface. Preferably, onsite computer 116 is a portable computing device, such as a handheld computer, laptop computer, or tablet device.

Onsite computer 116 may be used by any individual who, for example, is overseeing and/or directing the activities associated with personal navigation system 100. Continuing the example of a first responder application, onsite computer 116 may be used by a commander 118. In this example, commander 118 may be the incident commander at, for example, the scene of a fire and who is overseeing and/or directing the activities of subjects 110, who may be firefighters. Onsite computer 116 has radio communication capability for receiving/transmitting data from/to one or more personal communication devices 114. Further, residing on onsite computer 116 is a software application for processing in real time any information received from personal communication devices 114 and rendering a graphical representation of the activities of subjects 110 at the scene, also in real time. More details of an example of an onsite computer 116 are described with reference to FIGS. 4A and 4B.

FIG. 1 also shows a reference point 120, which is a common reference point to which all inertial modules 112 of personal navigation system 100 are initialized. Reference point 120 is the "origin" or 0,0,0 point of a local three-dimensional (3D) coordinate system 122 that is established in relation to inertial modules 112 of personal navigation system 100 during an initialization process.

Figure 2A:
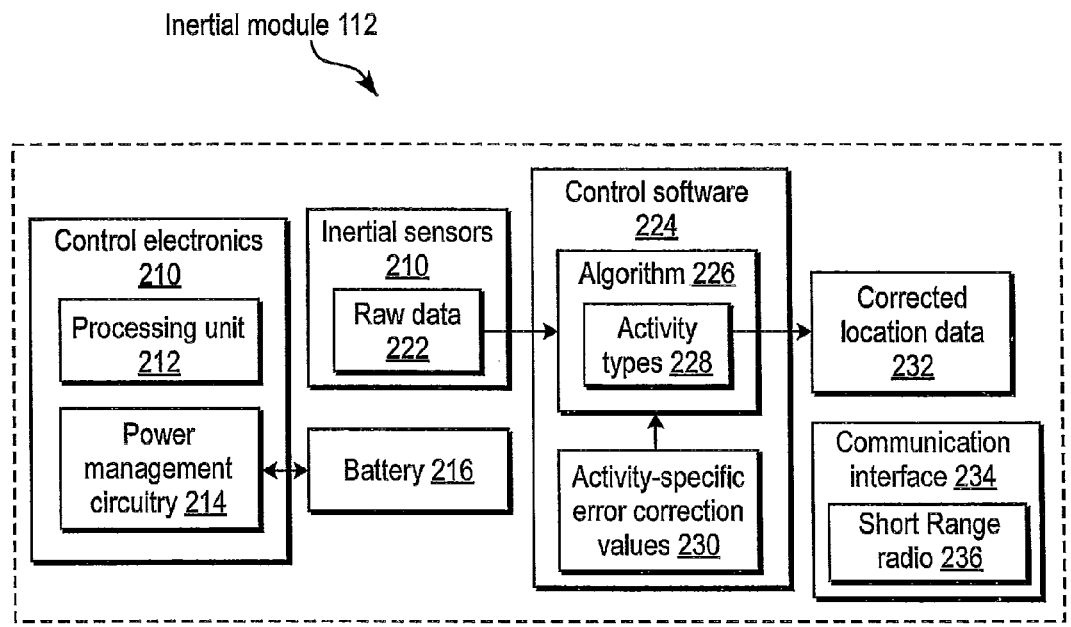
FIG. 2A is a functional block diagram of an example of an inertial module of the personal navigation system, according to the principles of the present invention.

FIG. 2A illustrates a functional block diagram of an example of inertial sensor module 112 of personal navigation system 100, according to the present disclosure. In this example, inertial sensor module 112 includes control electronics 210 that may further include a processing unit 212 and power management circuitry 214. Processing unit 212 may be any standard controller or microprocessor device that is capable of executing program instructions, such as those from control software 224 of inertial sensor module 112. Processing unit 212 is used to manage the overall operations of inertial sensor module 112. Power management circuitry 214 may be any circuitry for performing power management functions of inertial sensor module 112. In one example, power management circuitry 214 provides power regulation and may be used for recharging a battery 216 of inertial sensor module 112. Preferably, battery 216 is a rechargeable battery, but may, alternatively, be a non-rechargeable battery.

Generally, control electronics 210 may be used to manage data acquisition operations, data transmission operations, device power up and down sequences, initialization processes, and the acquisition of a 0,0,0, reference point, such as reference point 120 of FIG. 1.

Inertial sensor module 112 includes a set of inertial sensors 220. For example, inertial sensors 220 may include one or more electromagnetic sensors, multi-axis accelerometers, gyroscopes, magnetometers, and the like. Inertial sensors 220 may be implemented as small, low cost Micro Electro Mechanical Systems (MEMS) devices, rather than the large expensive military grade sensors. Even though there may be a significant amount of "drift error" associated with the small, low cost MEMS devices, their use is made possible by certain error correction processes of control software 224 of inertial sensor module 112 that allow any inaccuracy in the readings from the MEMS devices to be sufficiently error-corrected. This is otherwise not possible in existing inertial navigation systems. Raw data 222 represents the raw, unprocessed readings of inertial sensors 220.

Inertial sensors, such as inertial sensors 220, include those that measure force and from it develop acceleration, velocity, and displacement. One type of inertial sensor is an accelerometer. Accelerometers are sensing transducers that provide an output proportional to acceleration, vibration, and shock. An accelerometer is a device for measuring acceleration and gravity-induced reaction forces. A multi-axis accelerometer (e.g., 3-axis accelerometer) is able to detect magnitude and direction of the acceleration as a vector quantity. The acceleration may be expressed in terms of g-force, which is a measurement of an object's acceleration. Another type of inertial sensor is a gyroscope. A gyroscope is an inertial device that reacts to a change in orientation and can be used either to maintain the orientation or to report a change in the orientation.

Control software 224 may include, for example, a zero velocity updates (ZUPT) algorithm 226 for analyzing raw data 222 of inertial sensors 220, then determining certain activity types 228, and then applying activity-specific error correction values 230 in order to generate corrected location data 232. For example, the process that is performed by ZUPT algorithm 226 may be based on the systems and methods for measuring movement that are described with reference to U.S. Pat. No. 5,724,265, filed Dec. 12, 1995, entitled "System and method for measuring movement of objects;" U.S. Pat. No. 5,899,963, filed Jun. 17, 1997, entitled "System and method for measuring movement of objects;" U.S. Pat. No. 6,122,960, filed Dec. 16, 1998, entitled "System and method for measuring movement of objects;" U.S. Pat. No. 6,305,221, filed Jun. 14, 1999, entitled "Rotational sensor system;" and any combinations thereof and, thus, the disclosures of these patents are incorporated herein in their entirety.

By way of example, the '221 patent describes a device that measures the distance traveled, speed, and height jumped of a person while running or walking. Accelerometers and rotational sensors are placed in the sole of one shoe along with an electronic circuit that performs mathematical calculations to determine the distance and height of each step. A radio frequency transmitter sends the distance and height information to a wristwatch or other central receiving unit. A radio frequency receiver in the wristwatch or other unit is coupled to a microprocessor that calculates an output speed based upon step-distance and elapsed time, and the distance traveled of the runner from the sum of all previous step distances. The output of the microprocessor is coupled to a display that shows the distance traveled, speed, or height jumped of the runner or walker.

The process that is performed by ZUPT algorithm 226, which may be based on the '265, '963, '960, and/or '221 patents, may include, but is not limited to, the following steps.

Step 1—Continuously analyze raw data 222 of inertial sensors 220 in order to detect the presence of two conditions occurring simultaneously. The first condition to be detected is the minimum of the acceleration norm in 3 axes, which is measured using, for example, the 3-axis accelerometer of inertial sensors 220. That is, if the resultant vector of the 3 axes is the norm, the minimum of the acceleration may be detected. The second condition to be detected is the minimum angular velocity norm, which is measured using, for example, the gyroscope of inertial sensors 220.

Step 2—Detect the "quiescent point" for the two aforementioned quantities. When both the acceleration norm and the angular velocity norm are at minimum at the same time, this is hereafter referred to as the "quiescent point" in time. This quiescent point is based on the placement of inertial sensor module 112 at the foot of each subject 110, as the foot is the only part of the body that stops for any activity (e.g., walking, running, crawling, climbing, rappelling, jumping, falling, riding an elevator, and riding an escalator). Therefore, the detection of the "quiescent point" indicates the foot stopping.

Step 3—Measuring any motion of inertial sensors 220 that is present at the "quiescent point" in time indicates the drift error of the sensors. In this way, the drift error of the sensors is determined. The drift error can then be subtracted out of the reading to achieve a precise dynamic measurement. Therefore, once the "quiescent point" in time is detected, a process that may be referred to as zero velocity updates, or ZUPT, may be triggered.

Step 4—In the ZUPT process, raw data 222 of inertial sensors 220 is further analyzed in order to determine the orientation of the subject 110's foot.

Step 5—Once the orientation of the subject 110's foot has been determined, the orientation of the foot may be correlated to a certain type of activity. For example, activity types 228 of ZUPT algorithm 226 may contain the correlation of foot orientation to activity type. The types of activities that may be correlated in activity types 228 may include, but are not limited to, walking, running, crawling, climbing, rappelling, jumping, falling, riding an elevator, riding an escalator, and the like.

Step 6—Once the activity type has been determined, ZUPT algorithm 226 may apply other verification processes in order to ensure that the type of activity has been determined correctly.

Step 7—Because the error correction may be different for each activity type, once the type of activity is determined, predetermined activity-specific error correction may be applied. For example, the contents of activity-specific error correction values 230 may include unique error correction values for walking, unique error correction values for running, unique error correction values for crawling, unique error correction values for jumping, and so on. These activity-specific error correction values may be empirically determined and characterized in advance according to the '265, '963, '960, and/or '221 patents.

Referring again to the aforementioned process steps of ZUPT algorithm 226, because a "quiescent point" occurs with each footstep of a certain subject 110, ZUPT may be applied at each footstep and, therefore, the drift error of inertial sensors 220 is corrected at each footstep of subject 110. The result is corrected location data 232 for each inertial sensor module 112. Corrected location data 232 includes activity type information as well as location information.

Further, corrected location data 232 may include timestamp information provided by processing unit 212 and a device ID for identifying the source of the information.

Inertial sensor module 112 further includes a communication interface 234, which may be used for transmitting corrected location data 232 to an external device, including onsite computer 116. Communication interface 234 may be any wired and/or wireless communication interface by which information may be exchanged with other devices. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

Preferably, communication interface 234 of inertial sensor module 112 includes short range radio capability, such as a short range radio 236 that is based on, for example, Bluetooth® or Zigbee technology, which use the short-distance wireless communications standard based on the IEEE 802.15.4 standard. For each subject 110, short range radio 236 facilitates a wireless personal area network (PAN) between his/her inertial sensor module 112 and his/her personal communication device 114.

Figure 2B:
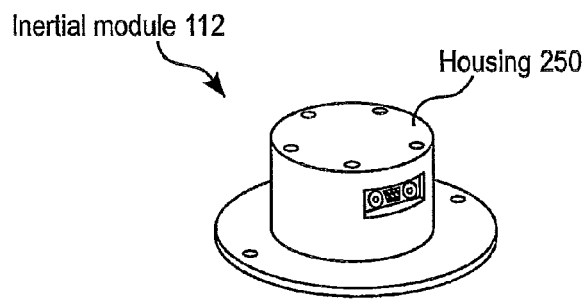
FIG. 2B is a perspective view of an example physical implementation of the inertial module of the personal navigation system, according to the principles of the present invention.

FIG. 2B illustrates a perspective view of an example physical implementation of inertial sensor module 112 of personal navigation system 100, according to the present disclosure. For example, inertial sensor module 112 may be packaged in a housing 250, such as shown in FIG. 2B. Housing 250 may have any attributes needed to operate in a hostile environment. For example, housing 250 may be rugged, waterproof, heat resistant, dust resistant, and so on. The shape of housing 250 is suitable to be foot-mounted and, in particular, to be suitably anchored in substantially the same position relative to the foot at all times.

Figure 3A:
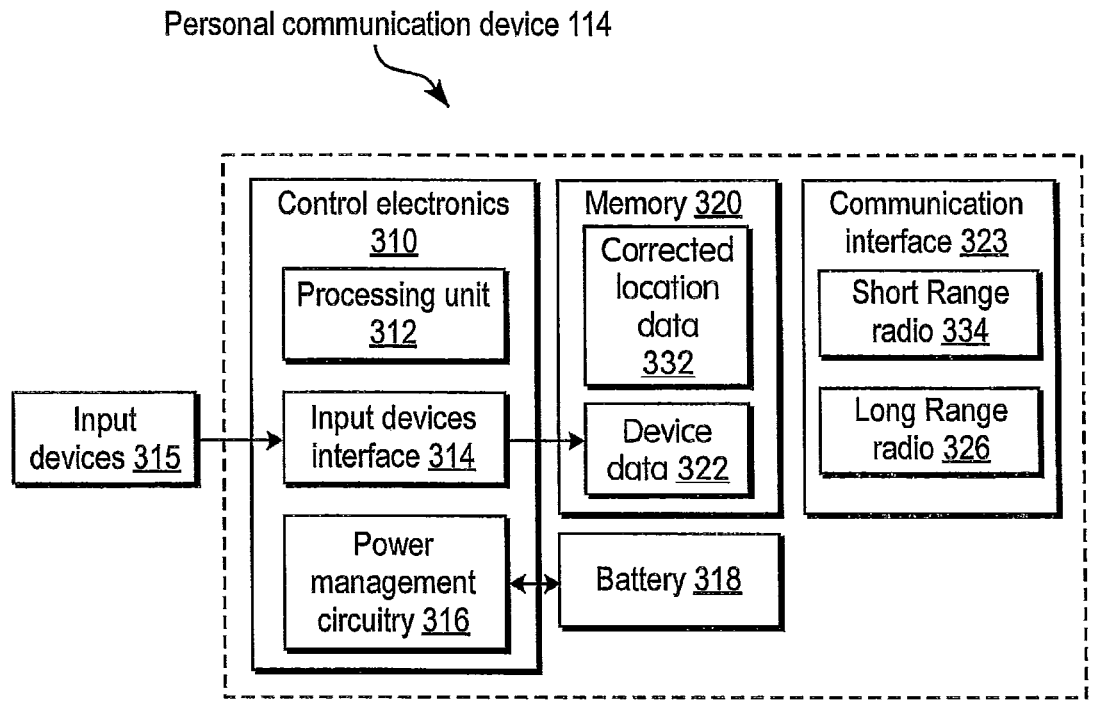
FIG. 3A is a functional block diagram of an example of a personal communication device of the personal navigation system, according to the principles of the present invention.

FIG. 3A illustrates a functional block diagram of an example of personal communication device 114 of personal navigation system 100, according to the present disclosure. In this example, personal communication device 114 includes control electronics 310 that may further include a processing unit 312 and power management circuitry 316. Processing unit 312 may be any standard controller or microprocessor device that is capable of executing program instructions. Processing unit 312 is used to manage the overall operations of personal communication device 114. Power management circuitry 316 may be any circuitry for performing power management functions of personal communication device 114. In one example, power management circuitry 316 provides power regulation and may be used for recharging a battery 318 of personal communication device 114. Preferably, battery 318 is a rechargeable battery, but may, alternatively, be a non-rechargeable battery.

Generally, control electronics 310 may be used to manage data acquisition operations, data transmission operations, device power up and down sequences, initialization processes, and so on.

Control electronics 310 may also include an input devices interface 314 for connecting (wired or wirelessly) to any number and types of input devices 315. Input devices 315 may be any devices worn by subjects 110 and/or incorporated into or associated with the equipment of subjects 110. For example, input devices 315 may include environmental sensors, such as, but not limited to, temperature sensors, light sensors, humidity sensors, and the like. Input devices 315 may include equipment sensors, such as, but not limited to, the PASS alarm or the air pressure sensor of the air tank of a firefighter. Input devices 315 may include biological sensors for monitoring the health status of subjects 110, such as, but not limited to, a blood pressure sensor, a perspiration sensor, a heart rate sensor, and the like. Input devices 315 may include other devices, such as, but not limited to, a digital camera and a digital audio recorder.

Personal communication device 114 includes local memory 320 for storing, for example, device data 322, which includes any readings returned from input devices 315. Further, device data 322 may include timestamp information provided by processing unit 312 and a device ID for identifying the source of the information. Also stored in memory 320 may be corrected location data 232 that is received from inertial sensor module 112, as described in FIG. 2A. Because corrected location data 232 and device data 322 include timestamp and device ID information, they may be correlated by any data processing application.

Personal communication device 114 further includes a communication interface 323, which may be used for exchanging information with inertial sensor module 112 and any other external device, such as onsite computer 116. Communication interface 323 may be any wired and/or wireless communication interface by which information may be exchanged with other devices. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, RF, IrDA compatible protocols, LAN, WAN, SWAP, any combinations thereof, and other types of wireless networking protocols.

Preferably, communication interface 323 of personal communication device 114 includes short range radio capability, such as a short range radio 324 that is based on, for example, Bluetooth® or Zigbee® technology, which use the short-distance wireless communications standard based on the IEEE 802.15.4 standard. For each subject 110, short range radio 324 facilitates a wireless PAN between his/her inertial sensor module 112 and his/her personal communication device 114.

Preferably, communication interface 323 of personal communication device 114 also includes long range radio capability, such as a long range radio 326 that is based on, for example, Wi-Fi technology, which uses the wireless communications standard based on the IEEE 802.11 standard. For each subject 110, long range radio 326 facilitates a wireless LAN between his/her personal communication device 114 and, for example, onsite computer 116.

Figure 3B:
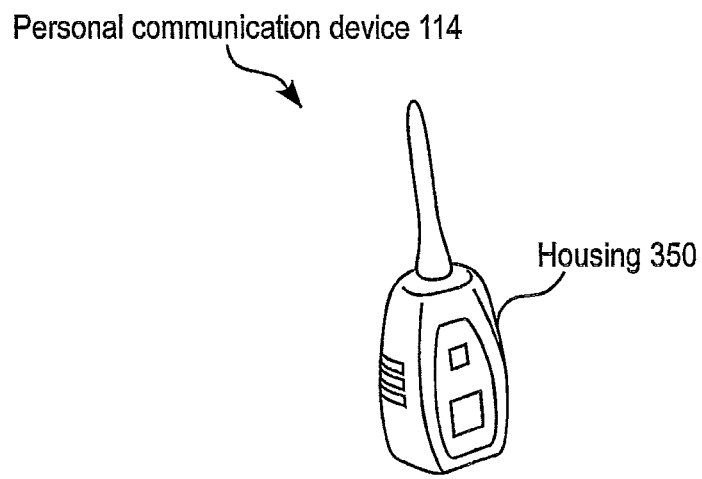
FIG. 3B is a perspective view of an example physical implementation of the personal communication device of the personal navigation system, according to the principles of the present invention.

FIG. 3B illustrates a perspective view of an example physical implementation of personal communication device 114 of personal navigation system 100, according to the present disclosure. For example, personal communication device 114 may be packaged in a housing 350, such as shown in FIG. 3B. Housing 350 may have any attributes needed to operate in a hostile environment. For example, housing 350 may be rugged, waterproof, heat resistant, dust resistant, and so on. Attached to housing 350 may be a connector or strap, which allows personal communication device 114 to be wearable, such as wearable around the shoulder of subjects 110 as shown in FIG. 1. Personal communication device 114 may be a stand-alone unit or may be integrated into another device worn by the subject, such as a self-contained breathing apparatus (SCBA) worn by a firefighter.

Figure 4A:
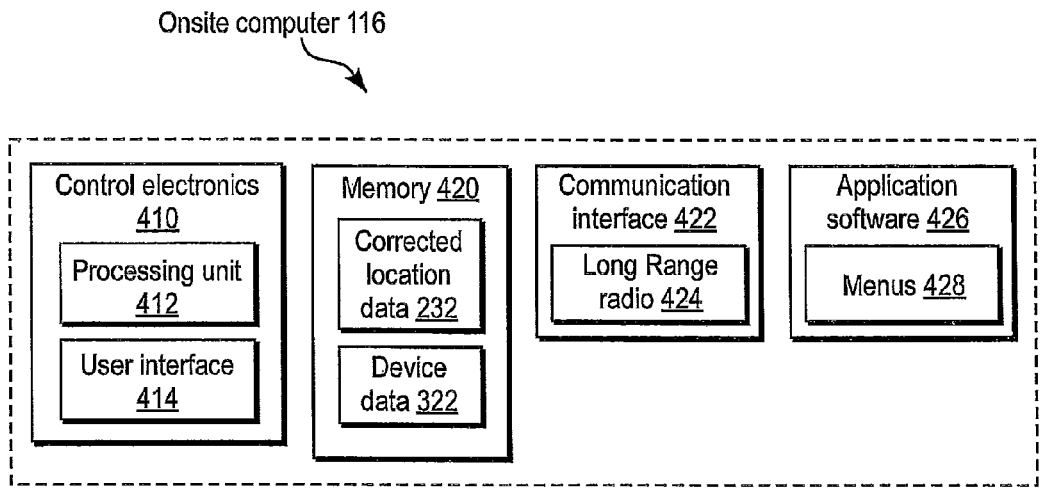
FIG. 4A is a functional block diagram of an example of an onsite computer of the personal navigation system, according to the principles of the present invention.

FIG. 4A illustrates a functional block diagram of an example of onsite computer 116 of personal navigation system 100, according to the present disclosure. In this example, onsite computer 116 includes control electronics 410 that may further include a processing unit 412 and a user interface 414. Processing unit 412 may be any standard controller or microprocessor device that is capable of executing program instructions. Processing unit 412 is used to manage the overall operations of onsite computer 116.

Figure 4B:
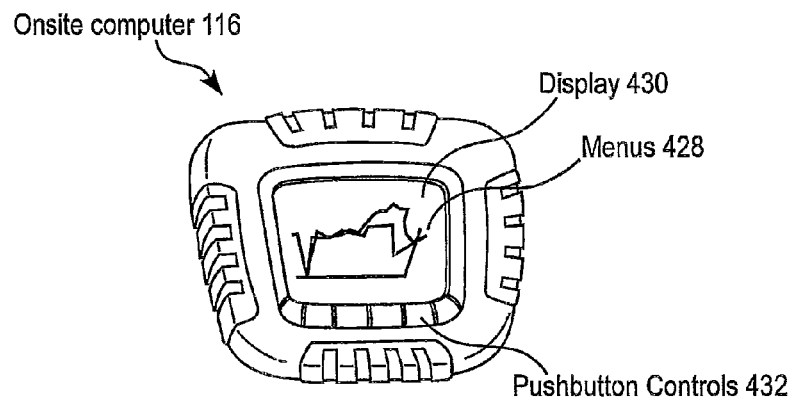
FIG. 4B is a perspective view of an example physical implementation of the onsite computer of the personal navigation system, according to the principles of the present invention.

User interface 414 of onsite computer 116 may be formed of any mechanism or combination of mechanisms by which the user may operate the device and by which information that is processed by the device may be presented to the user. For example, user interface 414 may include, but is not limited to, a display, a ruggedized touch panel, a keyboard, a mouse, one or more pushbutton controls, a keypad, an audio speaker, and any combinations thereof. In one example, FIG. 4B shows a display 430 and a set of pushbutton controls 432.

Onsite computer 116 includes local memory 420 for storing, for example, device data 322 that is received from input devices 315 that may be connected to one or more personal communication devices 114. Also stored in memory 420 may be corrected location data 232 that is received from one or more inertial modules 112. Because corrected location data 232 and device data 322 include timestamp and device ID information, they may be correlated by any data processing application, such as application software 426 residing at onsite computer 116. Because corrected location data 232 and device data 322 that is associated with multiple subjects 110 is stored in memory 420, memory 420 serves a data warehouse function of personal navigation system 100 that may be managed by application software 426.

Onsite computer 116 further includes a communication interface 422, which may be used for exchanging information with one or more personal communication devices 114. Communication interface 422 may be any wired and/or wireless communication interface by which information may be exchanged with other devices. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, RF, IrDA compatible protocols, LAN, WAN, SWAP, any combinations thereof, and other types of wireless networking protocols.

Preferably, communication interface 422 of onsite computer 116 includes long range radio capability, such as a long range radio 424 that is based on, for example, Wi-Fi technology. Long range radio 426 facilitates a wireless LAN between onsite computer 116 and, for example, any number of personal communication devices 114 of personal navigation system 100.

Application software 426 of onsite computer 116 is a software application for acquiring and processing corrected location data 232 that originates from any number of inertial modules 112 and device data 322 that originates from any number of personal communication devices 114. Corrected location data 232 and device data 322 are analyzed by application software 426 for the purpose of presenting any useful information to the user and, in particular, for rendering a graphical representation of the locations and activities of subjects 110 at the scene of the incident, such as for rendering a graphical representation of the locations and activities of firefighters in or near a building at the scene of the incident. A set of menus 428 of application software 426 provide a graphical user interface (GUI) by which the graphical representation is displayed to the user thereof, such as to commander 118 who is using onsite computer 116. Examples of menus 428 are shown with reference to FIGS. 7 through 14.

FIG. 4B illustrates a perspective view of an example physical implementation of onsite computer 116 of personal navigation system 100, according to the present disclosure. In this example, onsite computer 116 is implemented as a handheld tablet device that includes display 430 and the set of pushbutton controls 432. FIG. 4B also shows that certain menus 428 may be presented to the user via display 430.

Referring to FIGS. 1 through 4B, the operation and use of personal navigation system 100 for tracking one or more subjects 110 who are wearing respective inertial modules 112 and personal communication devices 114 are described with reference to FIG. 5.

Figure 5:
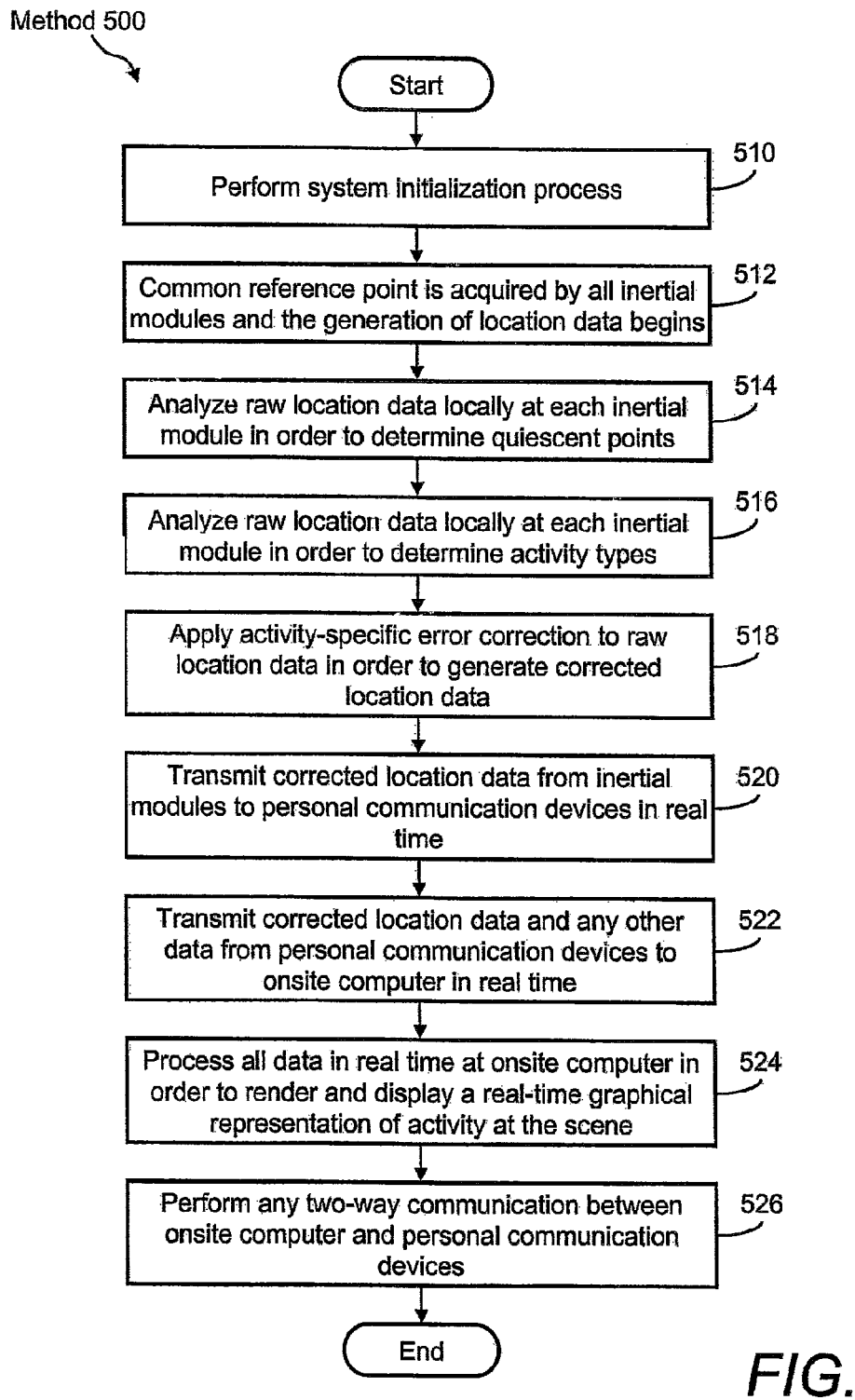
FIG. 5 is a flow diagram of an example of a method of operation of the personal navigation system, according to the principles of the present invention.

FIG. 5 illustrates a flow diagram of an example of a method 500 of operation of personal navigation system 100, according to the present disclosure. Method 500 may include, but is not limited to, the following steps, which may be implemented in any order.

At step 510, a system initialization process is performed. For example, an initialization process of personal navigation system 100 may include any preconditioning processes that are necessary for proper operation thereof. For example, the initialization process may include capturing the initial drifts and biases of inertial sensors 220 of each inertial sensor module 112, initializing the multiple inertial modules 112 to a common coordinate system and heading, which allows the multiple inertial modules 112 to be correlated to one another, and so on. Further, the initialization process may include forming a hard association between a certain inertial sensor module 112 and a certain personal communication device 114 worn by each subject 110. In this way, data transmission from the devices of one subject 110 may not be confused with data transmission from the devices of another subject 110.

At step 512, a common reference point, such as reference point 120 of FIG. 1, is acquired by all inertial modules 112 and inertial modules 112 begin generating location data. In one example, a certain location at the scene of the incident may be designated as the common launch off point of all subjects 110. For example, the designated launch off point may be the front entrance of a building at the scene. In this case, each subject 110 physically goes to the designated launch off point at the front entrance of the building and initiates a reference capture event of his/her inertial sensor module 112. This may occur, for example, by pressing a "reference capture" button on each personal communication device 114, which communicates the reference capture event to its corresponding inertial sensor module 112. Thereafter inertial modules 112 compute their own updated position and velocity by integrating information received from inertial sensors 220. In doing so, inertial modules 112 begin generating location data, such as raw data 222.

At step 514, the raw location data is analyzed locally at each inertial module in order to determine the quiescent points. For example, at each inertial sensor module 112, ZUPT algorithm 226 analyzes raw data 222 in order to determine the "quiescent points" of its inertial sensors 220 according to the '265, '963, '960, and/or '221 patents, as described with reference to FIG. 2A.

At step 516, the raw location data is analyzed locally at each inertial module in order to determine activity types. For example, at each inertial sensor module 112, having determined the "quiescent points" in time of its inertial sensors 220, ZUPT algorithm 226 further analyzes raw data 222 in order to determine the activity type associated with the movement and/or orientation of the inertial sensors 220 at the "quiescent points" in time, according to the '265, '963, '960, and/or '221 patents, as described with reference to FIG. 2A. For example, activity types 228 of ZUPT algorithm 226 may contain the correlation of foot orientation to activity type. The types of activities may include, but are not limited to, walking, running, crawling, climbing, rappelling, jumping, falling, riding an elevator, riding an escalator, and the like.

At step 518, the activity-specific error correction is applied to the raw location data in order to generate corrected location data at each inertial module. For example, at each inertial sensor module 112, having determined the activity type, ZUPT algorithm 226 applies the activity-specific error correction values 230 to raw data 222 in order to generate corrected location data 232 at each inertial module. For example, ZUPT algorithm 226 may apply unique error correction values for walking, unique error correction values for running, unique error correction values for crawling, unique error correction values for jumping, and so on, according to the '265, '963, '960, and/or '221 patents. The contents of corrected location data 232 includes, for example, the error-corrected xyz coordinates, activity type information, timestamp information, and device ID information.

Figure 6A:
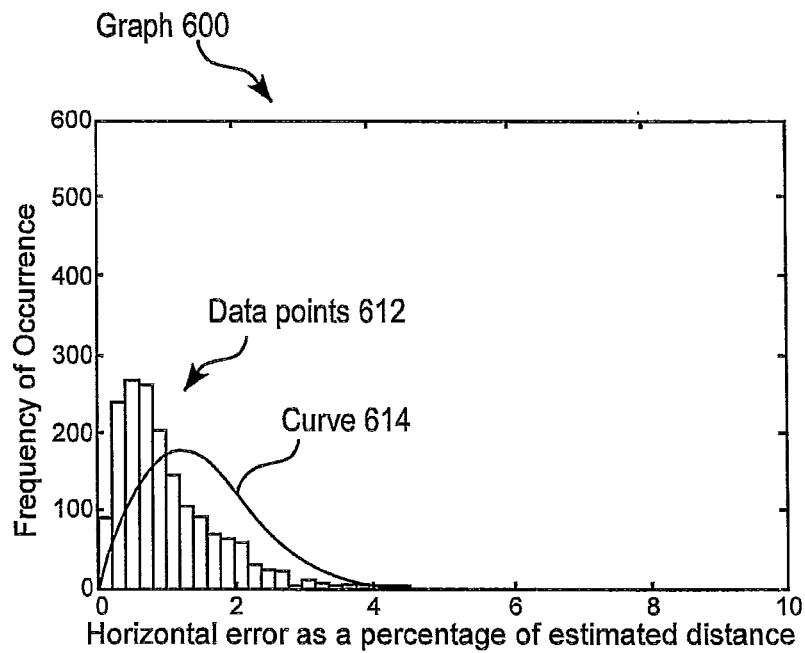
FIGS. 6A and 6B represent graphs of example results of error correction that is performed using the personal navigation system, according to the principles of the present invention.
Figure 6B:
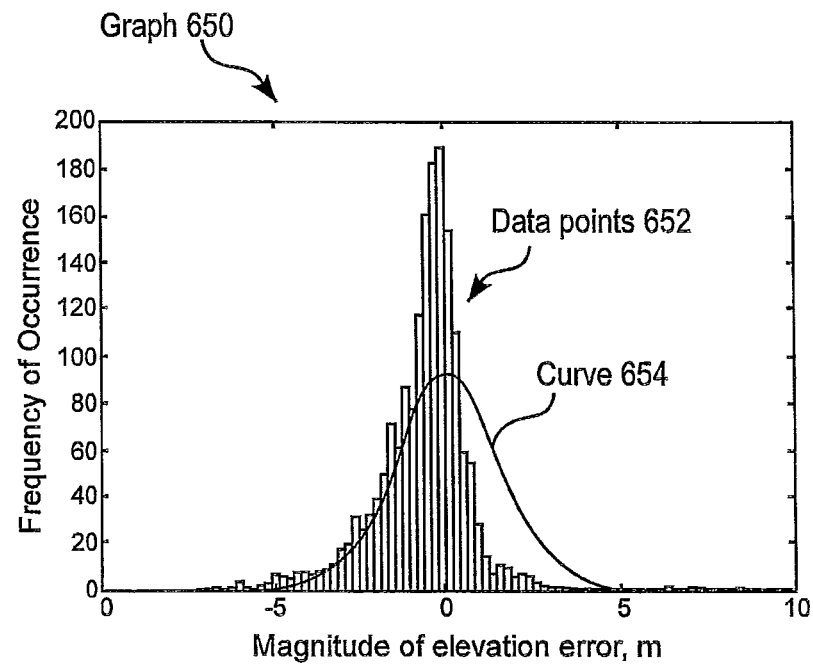

Continuing step 518, an example of the results of the error correction process that is performed by ZUPT algorithm 226 according to '265, '963, '960, and/or '221 patents are depicted with reference to FIGS. 6A and 6B. More specifically, FIGS. 6A and 6B illustrate a graph 600 and a graph 650, respectively, of example results of error correction that is performed using personal navigation system 100, according to the present disclosure.

Graph 600 of FIG. 6A is a plot of the "Frequency of occurrence" vs. "Horizontal error as a percentage of estimated distance." Graph 600 shows a bar chart of a sample of data points 612, where each bar represents an accuracy level. Graph 600 also shows a curve 614, which is a plot of the average of all data points 612 for the different activities (e.g., walking, running, crawling, climbing, rappelling, jumping, falling, riding an elevator, and riding an escalator), different buildings, different paths, and so on. Along the x-axis of graph 600, curve 614 shows the accuracy of distance traveled, with the results between about 0% error and about 4% error, with most occurring at between about 0% error and about 2% error. Generally, curve 614 shows that an accuracy of about 3% error or less was achieved about 95% of the time.

Graph 650 of FIG. 6B is a plot of the "Frequency of occurrence" vs. "Magnitude of elevation error" for the specific activity of crawling. Graph 650 shows a bar chart of a sample of data points 652 for the specific activity of crawling, where each bar represents an accuracy level. Graph 650 also shows a curve 654, which is a plot of the average of all data points 652 for the activity of crawling. Along the x-axis of graph 650, curve 654 shows the accuracy of elevation traveled, with the results largely in the ±3% error range.

At step 520, corrected location data 232 is transmitted in real time from the inertial modules 112 to their corresponding personal communication devices 114. For example, each inertial sensor module 112 transmits its corrected location data 232 via its short range radio 236. The corrected location data 232 is then received by the short range radio 324 of the corresponding personal communication device 114. The corrected location data 232 may be temporarily cached in memory 320 of personal communication device 114. Alternatively, the corrected location data 232 may be sent directly to onsite computer 116.

At step 522, the corrected location data 232 and any other data, such as device data 322, is transmitted in real time from personal communication devices 114 to onsite computer 116. Both corrected location data 232 and device data 322 may include timestamp information and device ID information. Again, the contents of corrected location data 232 includes, for example, the error-corrected xyz coordinates as well as the activity type information.

At step 524, all data that is received at onsite computer 116 is processed in real time in order to render and display a real-time graphical representation of any activity at the scene. For example, all corrected location data 232 and/or device data 322 associated with all subjects 110 that is received at onsite computer 116 is processed by application software 426 in real time in order to render and display a real-time graphical representation of any activity at the scene, which may be presented to a user via menus 428 of application software 426. Examples of menus 428 are shown with reference to FIGS. 7 through 14. In one example, FIGS. 7, 8, 9, and 10 depict a certain sequence of tracking certain subjects 110 that are associated with personal navigation system 100.

At step 526, any two-way communication may be performed between onsite computer 116 and personal communication devices 114. For example, at any time throughout the operation of personal navigation system 100, two-way communication may be performed between onsite computer 116 and personal communication devices 114 of subjects 110 for any reason, such as to provide navigation instructions and/or to communicate alert and/or any other useful information.

FIGS. 7, 8, 9, and 10 show a main menu 700, which is an example of a menu 428 of application software 426 at onsite computer 116 of personal navigation system 100, and a sequence of tracking certain subjects 110, according to the present disclosure. Main menu 700 is an example of using certain color-coded and/or shape-specific iconography in order to allow users of personal navigation system 100 to quickly assess the activities and locations of subjects 110 that are dispatched to an incident scene. By way of example, the subjects 110 that are graphically shown in main menu 700 of FIGS. 7 through 10 are depicted as "firefighter" icons.

More specifically, main menu 700 of FIGS. 7 through 10 includes a set of one or more function tabs 710. For example, main menu 700 may include a "Team View" function tab 710, a "Location View" function tab 710, a "Playback" function tab 710, and a "Data Controls" function tab 710. Main menu 700 includes other toolbars, pushbuttons, and any other iconography for performing and/or depicting any useful function of personal navigation system 100.

FIGS. 7 through 10 show main menu 700 when the "Location View" function tab 710 is selected. This view includes a viewing window 712 in which the graphical representation of any activity at the scene is rendered in real time by use of corrected location data 232 and/or device data 322. For example, rendered in viewing window 712 is an image of a structure 720, which may represent the building which is the subject of the first responder event.

When there is no available electronic information about structure 720, application software 426 may provide the user with a generic image of a wireframe. The user, such as commander 118, may input the width and depth of the building and the number of floors. In this way, an image of structure 720 may be rendered. Alternatively, no image of a structure is displayed. In this case, the images of subjects 110 may appear to be wandering in space. However, even without the structure's context, application software 426 is able to effectively communicate the positions of subjects 110 relative to one another and the activities of subjects 110.

In the example of main menu 700 of FIGS. 7 through 10, reference point 120 is depicted as a target icon that is located outside of and near structure 720. A subject 110a is shown, wherein a path 722a of subject 110a, which depicts the movement of subject 110a, begins at reference point 120 and progresses into the first floor and then to the second floor of structure 720. As the movement of subject 110a progresses inside of structure 720, FIG. 8 of the sequence shows an alarm condition occurring. This is graphically shown by a red alarm icon 724 of main menu 700 being displayed to the user. Additionally, when the alarm condition is present, the color of the icon of the subject 110 in danger may change from black to red. In this example, the "firefighter" icon of subject 110a changes from black to red.

Figure 7:
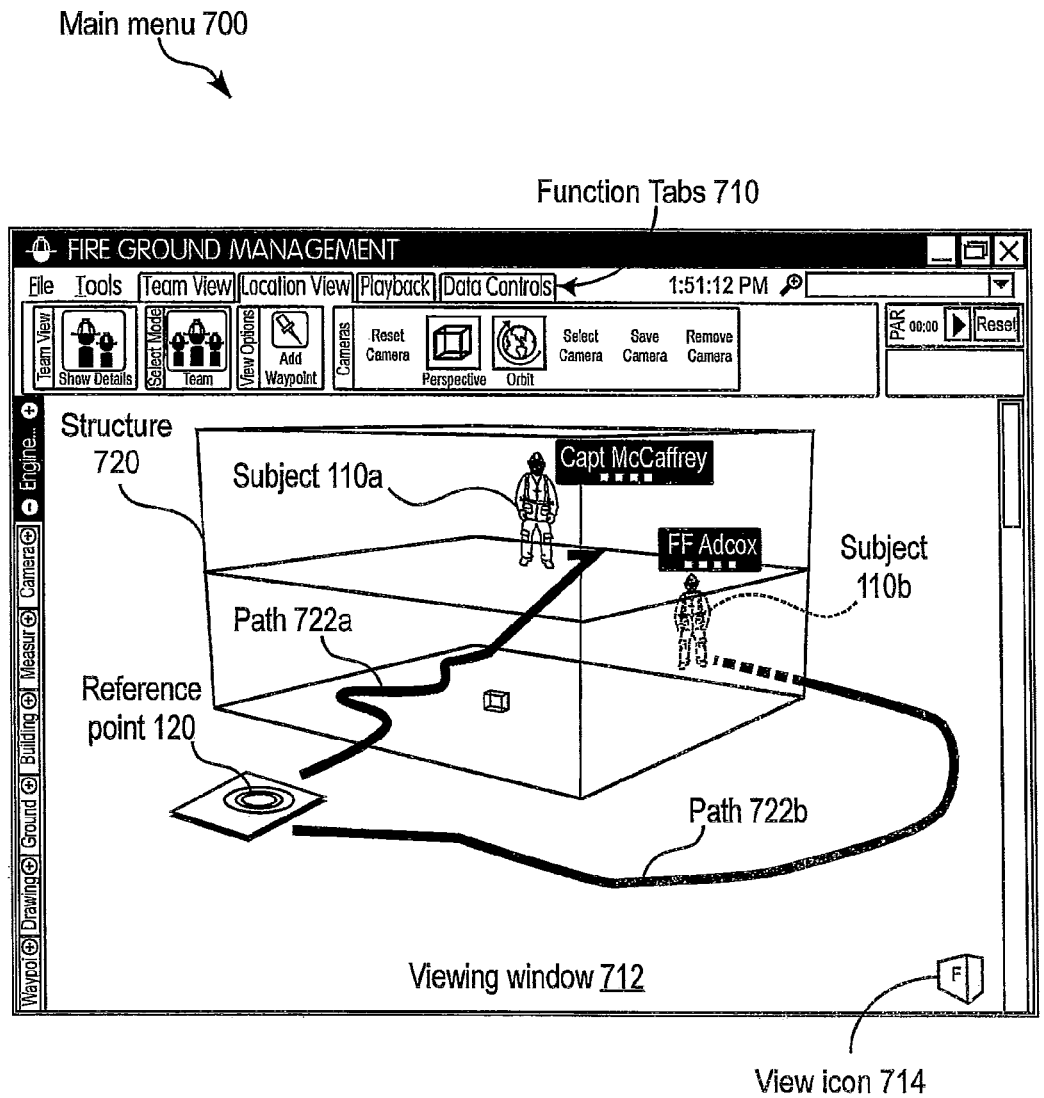
FIGS. 7-10 show a main menu, which is an example menu of the application software of the personal navigation system, and a sequence of tracking certain subjects, according to the principles of the present invention.
Figure 8:
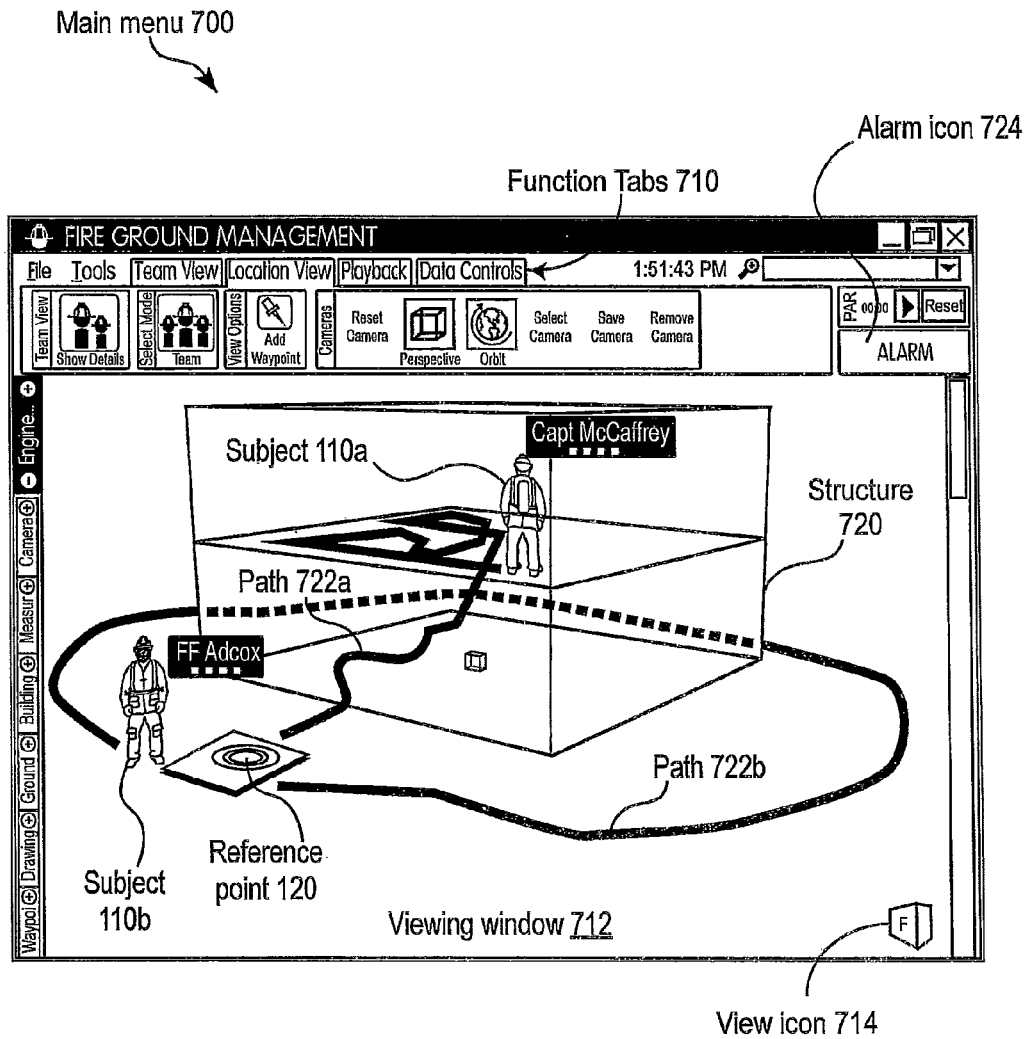
Figure 9:
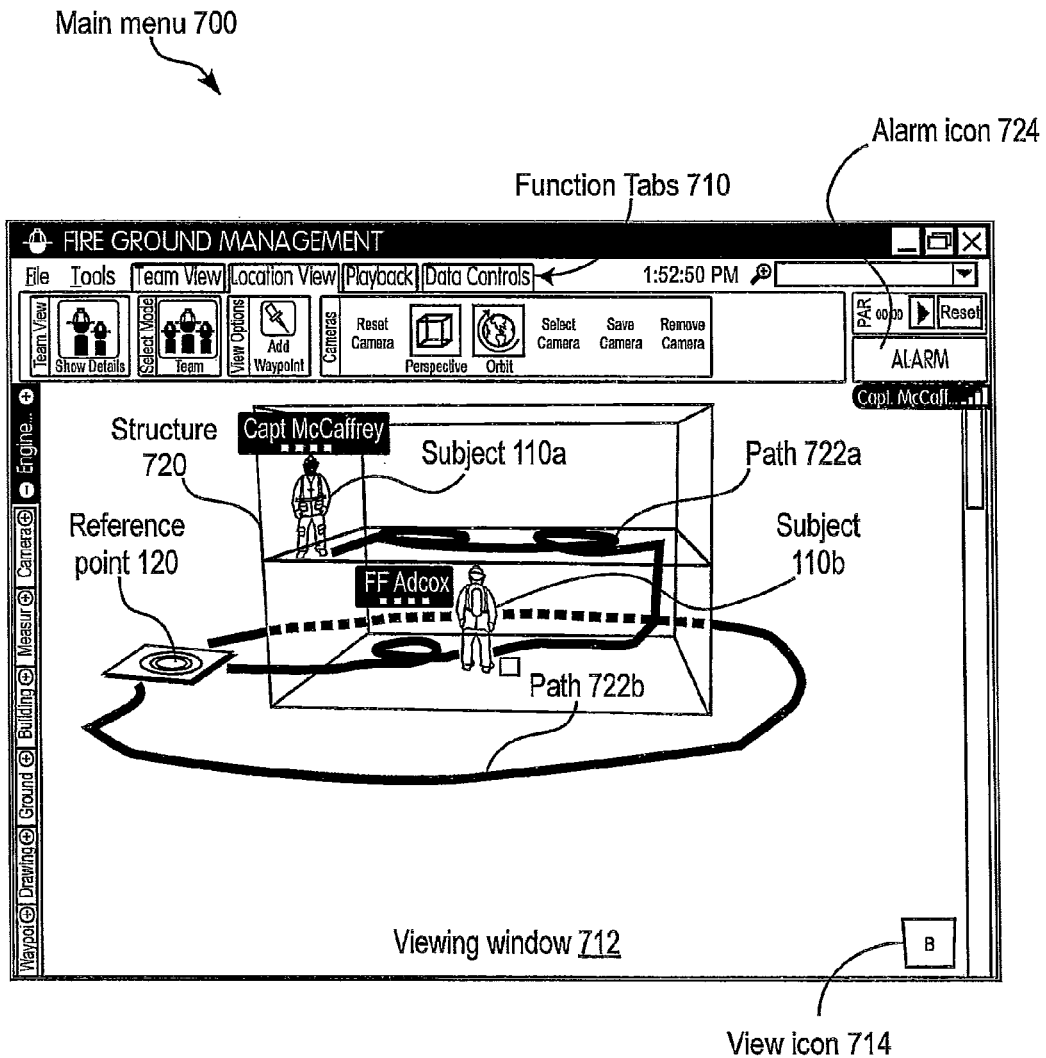
Figure 10:
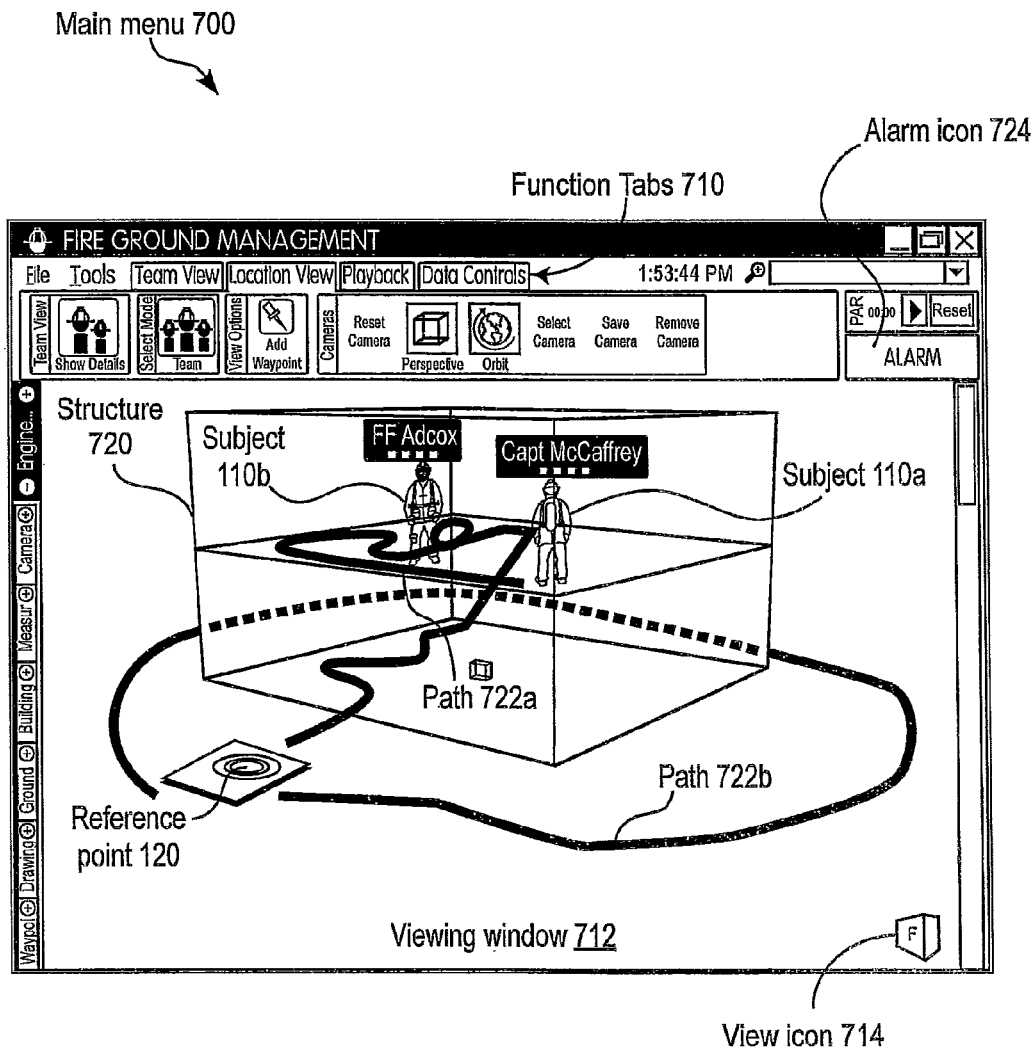

In this example sequence, a subject 110b is initially shown in FIG. 7 circling the outside of structure 720, as depicted by path 722b. However, once the alarm condition occurs, commander 118 may instruct subject 110b to enter the building and assist subject 110a. This is shown in main menu 700 of FIGS. 8 through 10, where path 722b of subject 110b is shown progressing into the first floor and then to the second floor of structure 720 and in proximity to subject 110a. The real-time rendering of this sequence that accurately shows the locations and activities of two subjects 110 is the result of analyzing in real time the corrected location data 232 and/or device data 322 of subject 110a and subject 110b.

Additionally, associated with the "firefighter" icons of each subject 110 may be ID information, such as the subject's last name. Further, multiple "firefighter" icons may be provided for graphically indicating each of the multiple types of activities. In the example shown in main menu 700 of FIGS. 7 through 10, the "firefighter" icons may indicate the activity of walking. Additionally, other information extracted from device data 322 may be presented in relation to a certain subject 110. For example, the air tank air level of subject 110a and/or 110b may be displayed along the progression of path 722a and/or 722b, respectively.

Referring again to main menu 700 of FIGS. 7 through 10, a view icon 714 in viewing window 712 allows the user to select, for example, certain degrees of front, back, and side views of the activity that is rendered in viewing window 712. Further, pan up, pan down, and/or zoom controls (not shown) may be provided in viewing window 712.

Figure 11:
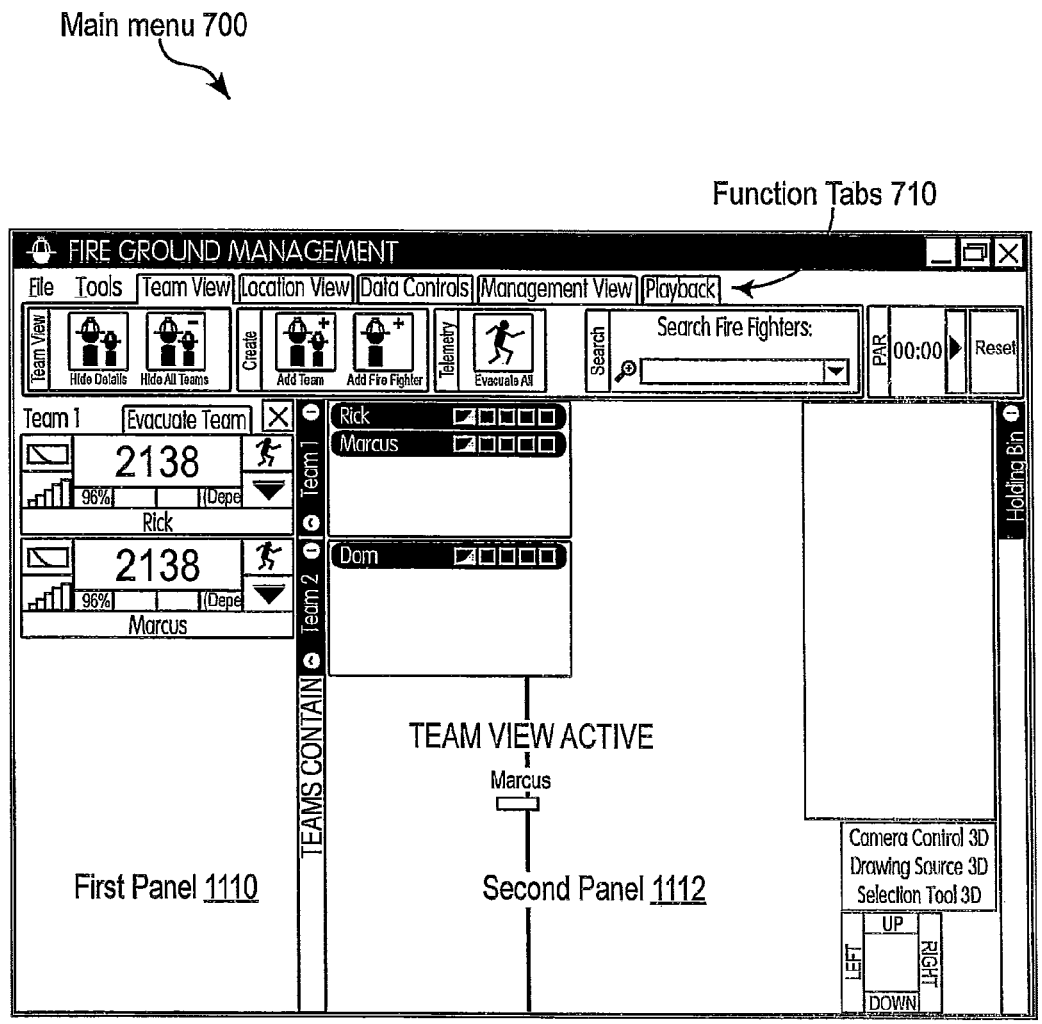
FIGS. 11-13 show another view of the main menu of the application software of the personal navigation system, according to the principles of the present invention.
Figure 12:
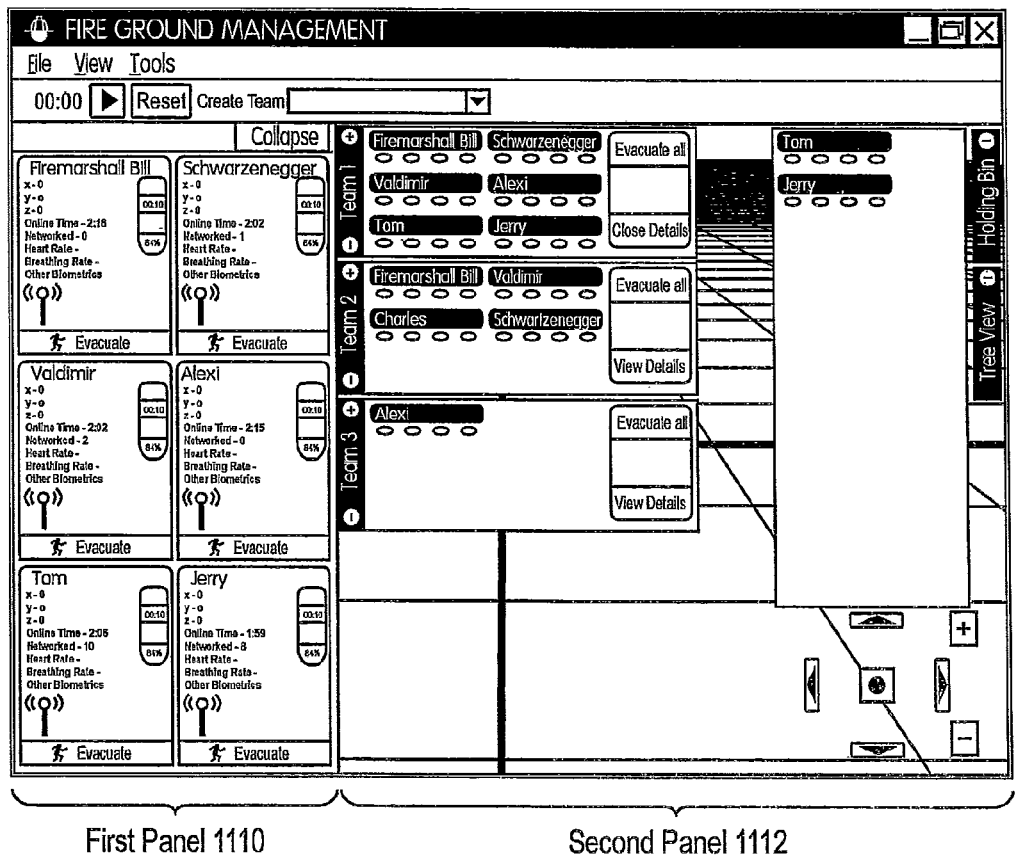
Figure 13:
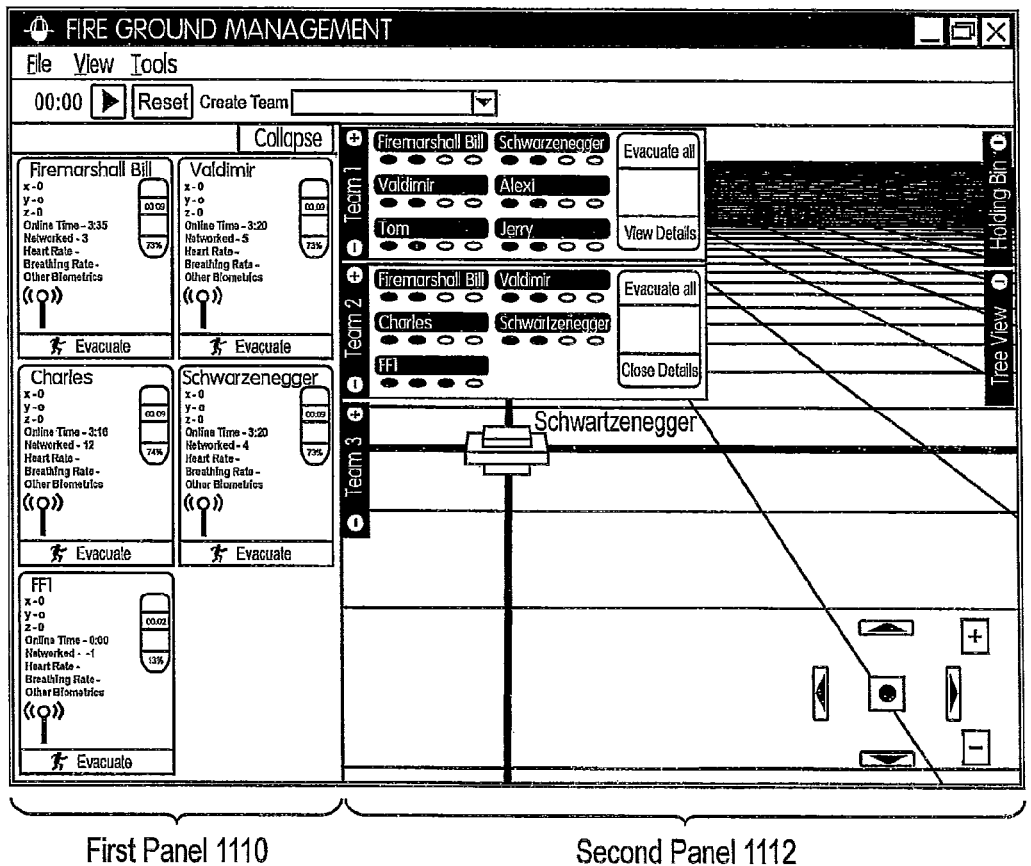

FIGS. 11, 12, and 13 show another view of main menu 700 of application software 426 of personal navigation system 100 according to the present disclosure. More specifically, FIGS. 11, 12, and 13 show main menu 700 when the "Team View" function tab 710 is selected. This view includes a first panel 1110 and a second panel 1112. Displayed in first panel 1110 may be individual team member-level information and displayed in second panel 1112 may be team-level information. For example, in first panel 1110, FIG. 11 shows a summary view of information about "Rick" and "Marcus," who are members of "Team 1." This information may include, for example, current sensor information and current activity type information of "Rick" and "Marcus." In second panel 1112, FIG. 11 shows a view of a list of teams, such as "Team 1" and "Team 2," and the names of their team members.

FIGS. 12 and 13 show an expanded view of information about individual team members of a selected team. For example, detailed information that is included in corrected location data 232 and device data 322 of six members of "Team 1" are shown in first panel 1110 of main menu 700. This detailed information may include, for example, the xyz coordinates, biometric information, air management data, radio link verification, and/or evacuation options of each team member. Additionally, color-coded icons may provide a rapid indication of the status of certain conditions. For example, green icons may indicate a satisfactory condition, yellow icons may indicate a moderately satisfactory condition, and red icons may indicate an unsatisfactory condition.

In one example, first panel 1110 of FIG. 12 shows "green" air tank icons in the information of certain team members, which is a visualization that means a satisfactory air level (based on current air management data). These color-coded meanings may carry over to certain icons in second panel 1112 of FIG. 12, but presented in the team-level information. In another example, first panel 1110 of FIG. 13 shows "yellow" air tank icons in the information of certain team members, which is a visualization that means a moderately satisfactory air level, as well as "red" air tank icons in the information of certain team members, which is a visualization that means a an unsatisfactory air level. Again, these color-coded meanings may carry over to certain icons in second panel 1112 of FIG. 12, but presented in the team-level information.

Referring again to FIGS. 7 through 13, the "Playback" function tab 710 facilitates a playback feature of personal navigation system 100. For example, once a collection of corrected location data 232 and device data 322 for any one or more subjects 110 is stored in memory 420, the playback feature allows any activity of the one or more subjects 110 to be viewed in a movie-like fashion in non-real time.

Figure 14:
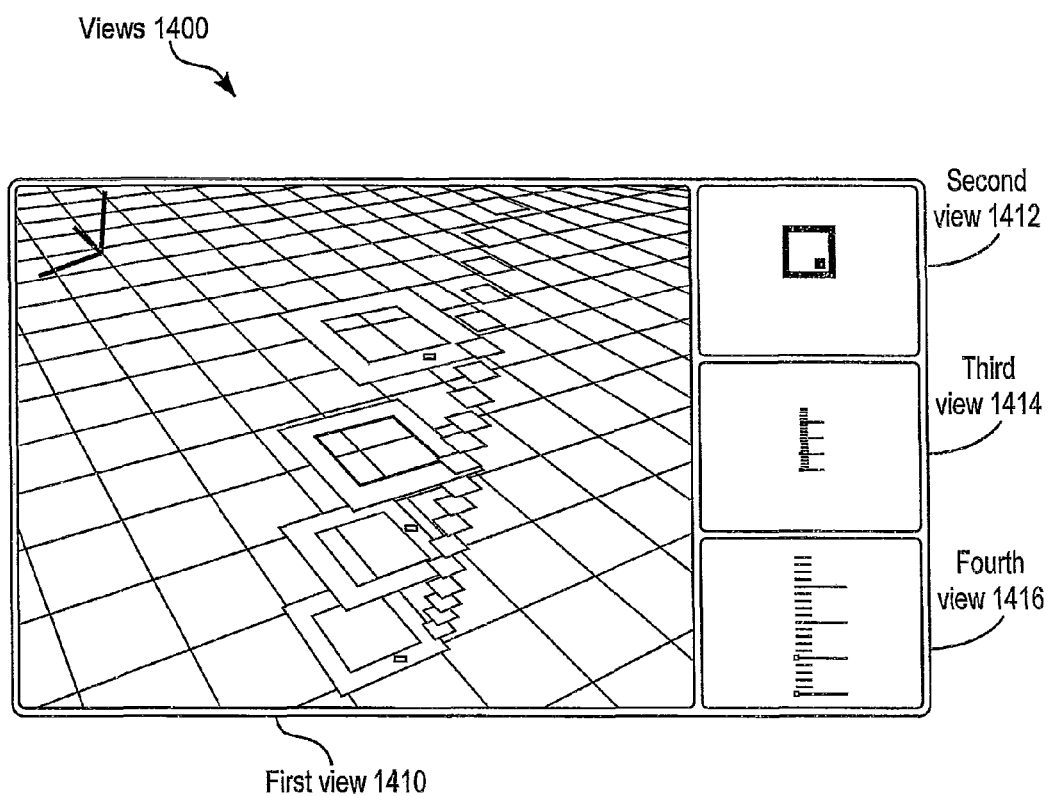
FIG. 14 shows an example of other views that may be displayed via certain menus of the application software of the personal navigation system, according to the principles of the present invention.

FIG. 14 shows an example of other views 1400 that may be displayed via certain menus 428 of application software 426 of personal navigation system 100, according to the present disclosure. For example, a first (3D) view 1410 displays a 3D view of an incident. A second (top) view 1412, a third (front) view 1414, and a fourth (side) view 1416 collectively show flat 2D views of the three axes (e.g., 2D views of the incident shown in 3D view 1410). More specifically, top view 1412 shows a bird's eye view of the incident shown in 3D view 1410, front view 1414 shows a front view of the incident shown in 3D view 1410, and side view 1416 shows a side view of the incident shown in 3D view 1410.

In summary and referring again to FIGS. 1 through 14, personal navigation system 100 and, for example, method 500 of the present disclosure provide the capability to accurately and reliably track one or more subjects 110 in indoor and/or outdoor environments in real time.

Further, personal navigation system 100 and method 500 of the present disclosure provide the capability to identify the type of activity (e.g., walking, running, crawling, climbing, rappelling, jumping, falling, riding an elevator, and riding an escalator) of one or more subjects 110 in real time. Once the type of activity is identified, personal navigation system 100 and method 500 of the present disclosure provide a mechanism for applying activity-specific error correction to the raw location data of inertial sensors 220 of inertial modules 112 in order to generate corrected location data 232 that accurately indicates the location of subjects 110 wearing the inertial modules 112.

Yet further, personal navigation system 100 and method 500 of the present disclosure provide the capability to accurately and reliably render a graphical representation of the activities of one or more subjects 110 in real time. In this way, a comprehensive visualization of the activity that is taking place at the scene is provided.

Yet further, personal navigation system 100 and method 500 of the present disclosure provide mechanisms for performing data processing locally at the inertial modules 112 worn by subjects 110, which are the subjects of the navigation and/or tracking process. As a result, rather than transmitting large volumes of raw data 222 from inertial sensors 220, the results only of the data processing (e.g., corrected location data 232) are transmitted from inertial modules 112 to onsite computer 116 in real time. In this way, the data bandwidth requirements of personal navigation system 100 are optimized.

Further still, personal navigation system 100 of the present disclosure is implemented with low complexity and low cost.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A personal navigation system, comprising:
   (a) at least one inertial sensor module associated with a user, the inertial sensor module comprising at least one sensor configured to generate location data associated with the user, wherein the at least one sensor is configured to be worn adjacent a foot of the user;
   (b) a communication device configured to at least one of receive and transmit at least a portion of the location data; and
   (c) an onsite computer configured to communicate with the communication device and receive at least a portion of the location data;
   (d) wherein at least one of the inertial sensor module and the onsite computer is configured to determine at least one activity of the user based at least in part upon at least a portion of the location data generated during a quiescent point of the foot of the user, and wherein the at least one activity is determined by correlating an orientation of the foot during the quiescent point to at least one of a plurality of activities including at least two of the following: walking, running, crawling, climbing, rappelling, jumping, falling, riding an elevator, riding an escalator, or any combination thereof;
   (e) wherein the onsite computer is programmed to configure a display including a representation of the user based at least in part upon the location data;
   (f) wherein at least one of the determination and the configuration is performed substantially in real-time; and
   (g) wherein the inertial sensor module is further configured to generate corrected location data using activity-specific error correction values, and the corrected location data is transmitted by the communication device to the onsite computer.

2. The personal navigation system of claim 1, wherein the location data comprises corrected location data generated by applying error correction to raw location data.

3. The personal navigation system of claim 1, wherein the communication device is at least one of: (i) a personal communication device located on the user and configured for communicating with at least one of the inertial sensor module and the onsite computer; and (ii) a communication device integrated with the inertial sensor module and configured for communicating with at least one of a personal communication device located on the user and the onsite computer.

4. The personal navigation system of claim 1, wherein the at least one inertial sensor comprises at least one of: at least one accelerometer, at least one gyroscope, or any combination thereof.

5. The personal navigation system of claim 4, wherein the at least one inertial sensor comprises a plurality of accelerometers and a plurality of gyroscopes.

6. The personal navigation system of claim 1, wherein at least one of the inertial sensor module and the onsite computer comprise software configured to at least one of: analyze raw location data, determine at least one activity of the user based at least partially upon the location data, apply activity-specific error correction values to generate corrected location data, configure a real-time graphical representation of the user based at least partially upon corrected location data, or any combination thereof.

7. The personal navigation system of claim 1, further comprising:
   (a) an inertial sensor module communication device comprising a short range radio configured to transmit location data;
   (b) a personal communication device comprising a long range radio configured to receive location data from the inertial sensor module communication device and transmit location data; and
   (c) an onsite computer communication device comprising a long range radio configured to receive location data from the personal communication device and process at least a portion of the location data for use in configuring a display.

8. The personal navigation system of claim 1, wherein the communication device is integrated into a Self Contained Breathing Apparatus and the user is a firefighter.

9. The personal navigation system of claim 1, wherein the activity-specific error correction values comprise at least one unique activity-specific error correction value for each activity of the plurality of activities.

10. A method of determining the location of a user wearing an inertial sensor module on at least one foot, the method comprising:
    (a) generating, by the inertial sensor module, raw location data;
    (b) determining, based at least partially on the raw location data, at least one quiescent point for the at least one foot of the user;
    (c) determining at least one activity of the user based at least partially on an orientation of the at least one foot during the at least one quiescent point;
    (d) applying activity-specific error correction to the raw location data to generate corrected location data;
    (e) transmitting the corrected location data to an onsite computer substantially in real-time; and
    (f) configuring, by the onsite computer, a real-time graphical representation of the user based at least partially upon the corrected location data.

11. The method of claim 10, further comprising configuring a real-time graphical display of an activity of the user.

12. The method of claim 10, further comprising continuously analyzing at least a portion of the raw location data to determine at least one of the minimum of the acceleration norm in three axes and the minimum angular velocity norm.

13. The method of claim 10, wherein, prior to generating raw location data, the method comprises acquiring, by the inertial sensor module, a common reference point.

14. The method of claim 10, wherein the step of transmitting the corrected location data to an onsite computer comprises: transmitting, substantially in real-time, the corrected location data from the inertial sensor module to a personal communication device located on the user; and transmitting, substantially in real-time, the corrected location data from the personal communication device to the onsite computer.

15. The method of claim 10, further comprising enabling two-way communication between the onsite computer and the personal communication device.

16. The method of claim 10, further comprising performing drift error correction to the raw location data before applying activity-specific error correction.

17. The method of claim 10, wherein the determination of at least one activity type of the user further comprises: correlating the orientation of the at least one foot with a certain type of activity.

18. The method of claim 10, wherein the activity-specific error correction comprises applying at least one unique value for each activity of a plurality of activities including at least two of the following: walking, running, crawling, climbing, rappelling, jumping, falling, riding an elevator, riding an escalator, or any combination thereof.

19. A personal navigation system comprising at least one onsite computer having a computer readable medium having stored thereon instructions, which, when executed by a processor of the computer, causes the processor to:

(a) receive location data generated by at least one sensor of at least one inertial sensor module located on the foot of a user;
(b) process the location data to determine a quiescent point of the foot of the user;
(c) determine an orientation of the foot during the quiescent point;
(d) determine an activity being performed by the user based at least partially on the orientation of the foot;
(e) apply at least one error correction value unique to the activity to the raw location data to generate corrected location data; and
(f) render, on a display and substantially in real-time, a graphical representation of the user based at least partially upon the generated corrected location data.

20. The personal navigation system of claim 19, wherein the at least one activity is determined by correlating the orientation of the foot to at least one of a plurality of activities including at least two of the following: walking, running, crawling, climbing, rappelling, jumping, falling, riding an elevator, riding an escalator, or any combination thereof.

* * * * *